Oct. 9, 1962        Q. H. MASSARO        3,057,386

POTATO BALL AND RING MACHINE

Original Filed Dec. 29, 1958        2 Sheets-Sheet 1

INVENTOR.
QUENTIN H. MASSARO
BY

ATTORNEY

Oct. 9, 1962 Q. H. MASSARO 3,057,386
POTATO BALL AND RING MACHINE
Original Filed Dec. 29, 1958 2 Sheets-Sheet 2
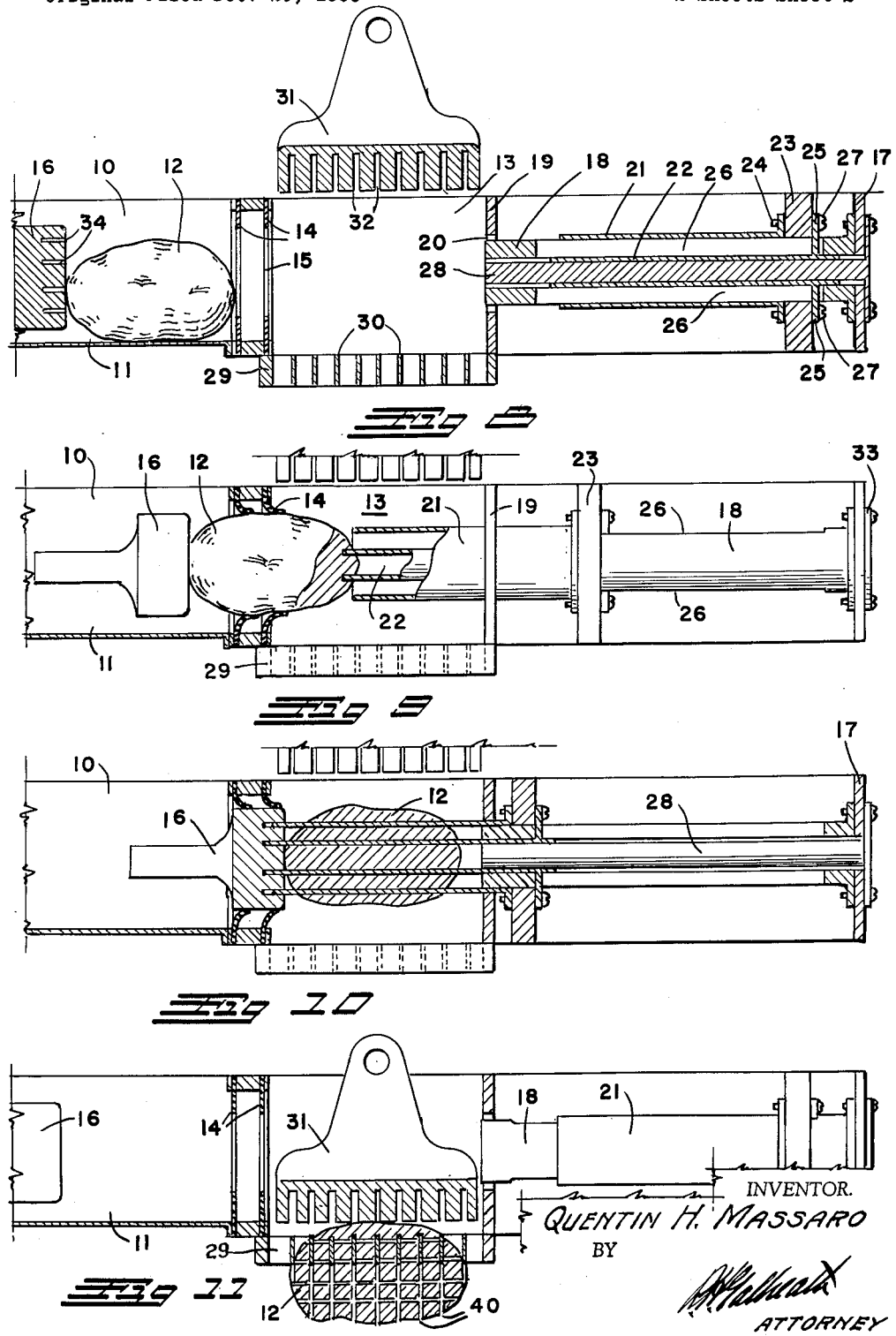
INVENTOR.
QUENTIN H. MASSARO
BY
ATTORNEY

United States Patent Office 3,057,386
Patented Oct. 9, 1962

3,057,386
POTATO BALL AND RING MACHINE
Quentin H. Massaro, 5525 W. 32nd Ave.,
Denver 14, Colo.
Original application Dec. 29, 1958, Ser. No. 783,502. Divided and this application Oct. 26, 1961, Ser. No. 148,795
5 Claims. (Cl. 146—78)

This invention relates to a potato product and to a method and means for making the same.

This application is a division of my copending application filed December 29, 1958, Serial No. 783,502, now abandoned.

The principal object of the invention is to provide a unique, appetizing and attractive deep fat fried food product on the order of the well-known French fried potatoes consisting of what might be termed "potato rings" and "potato balls."

Another object of the invention is to provide a means and method for rapidly, economically and efficiently forming a potato into the desired potato rings and potato balls prior to the frying process.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIGS. 8, 9, 10 and 11 are diagrammatic sectional views illustrating the progress of a potato through the improved method of forming potato rings.

Figure 1:
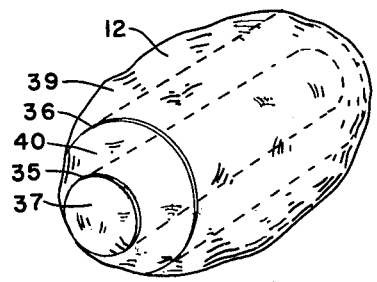
FIG. 1 is a perspective view of a potato illustrating it as it would appear after passing through the first step in the process of forming the potato rings and balls.

Briefly, the method comprises forcing a plurality of hollow concentric cylindrical tubes through a potato, withdrawing the tubes and slicing the potato at spaced intervals and at right angles to the axis of the tubes.

One means for efficiently carrying out the above method is diagrammatically illustrated in FIGS. 8 through 11. Such means provides a suitable supporting frame 10 which supports a receiving trough 11 for receiving a potato, such as indicated at 12, and a slicing compartment 13 having a front wall 19. The slicing compartment is separated from the trough 11 by a plurality of flexible diaphragms 14 of rubber or similar flexible elastic material. The diaphragms are provided with aligned guide openings 15 of a diameter slightly smaller than the normal diameter of the minimum sized potato for which the means is designed.

A feed plunger 16 is arranged to be reciprocated longitudinally of the trough 11 by any conventional means. The plunger 16 contacts the potato and forces it forwardly into the guide openings 15 in the resilient diaphragms 14, which acts to resiliently and axially align the potato with the plunger.

The frame 10 also supports a fixed end plate 17 upon which a horizontal tubular guide member 18 is mounted. The guide member extends rearwardly in axial alignment with the plunger 16 and through an opening 20 in the front wall 19 of the slicing compartment.

An outer cutting tube 21 is slidably mounted on the exterior of the tubular guide member 18 and an inner cutting tube 22 is slidably mounted within the guide member 18. The outer cutting tube 21 is mounted directly upon a reciprocable cross head member 23 as indicated at 24. The cross head member 23 is arranged to be reciprocated longitudinally of the frame 10 in any conventional manner. Radially extending arms 25 are formed on the inner cutting tube 22 and extend radially outward through longitudinal slots 26 in the guide member 18. These arms 25 are also mounted on the cross head member 23, as indicated at 27, so that the two cutting tubes 21 and 22 move in unison with the cross head member 23. The inner cutting tube projects slightly rearward of the outer cutting tube.

A core rod 28 extends completely through the guide member 18 and through the inner cutting tube 22. The core rod 28 is fixedly secured to the fixed end plate 17 in any desired manner. As illustrated, the forward extremity of the core rod is provided with a mounting flange 33 which is detachably secured to the fixed end plate 17.

The floor of the cutting compartment consists of a knife grill 29 having a plurality of parallel transversally-extending cutting knives 30 and a descending plunger 31 is positioned above the cutting compartment and is arranged to be forced downwardly into the compartment by any suitable mechanism, such as that at present in use on potato slicing machines. The descending plunger is provided with knife-receiving slots 32 positioned to allow the plunger to descend below the level of the top of the knife grill 29.

The method and the resulting product can best be described by following through a typical potato.

Let us assume that the potato 12 is dropped into the trough 11 as shown in FIG. 8. The feed plunger 16 moves forwardly to force the potato into the resilient, aligning grip of the openings 15 in the flexible diaphragms 14 to center the potato. The cross head member also moves rearwardly to cause the rearwardly-projecting inner cutting tube 22 to engage the potato to maintain it centered as shown in FIG. 9.

The cross head member 23 continues to move rearwardly and the feed plunger continues to move forwardly until the potato is centered in the cutting compartment with the cutting tubes extending completely therethrough and into receiving grooves 34 in the feed plunger as shown in FIG. 10.

The cutting tubes 21 and 22 and the feed plunger now return to the positions of FIG. 8 and the potato drops to the knife grill 29. The potato is now in the condition shown in FIG. 1 with two longitudinally-extending cylindrical cuts 35 and 36 dividing the potato into an elongated core portion 37, an elongated ring portion 38, and a shell portion 39.

Figure 2:
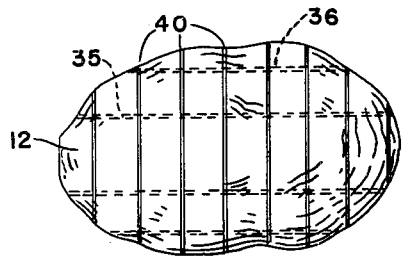
FIG. 2 is a side view of the potato of FIG. 1 after it has passed through the second step of the process.
Figure 3:
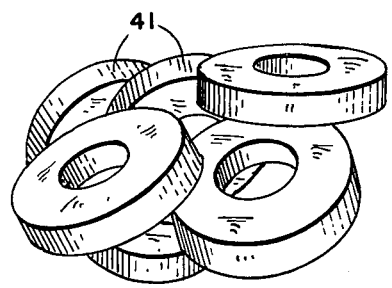
FIG. 3 is a perspective view illustrating the potato rings as they would appear immediately after forming.
Figure 4:
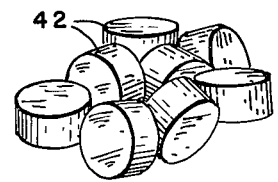
FIG. 4 is a similar perspective view illustrating the potato balls as they would appear prior to the frying step.

The descending plunger 31 now descends upon the potato and forces it through the knife grill 29, as shown in FIG. 11, as that a plurality of parallel uniformly spaced transverse cuts 40 are formed therein as shown in FIG. 2. The potato can be allowed to drop directly from the knife grill into the frying vat. It will be noted that if the cut potato of FIG. 2 be disassembled it will produce a plurality of irregular shell rings which may be discarded, or used for other products or which may be allowed to follow through the method. In addition to the shell rings there will be a plurality of perfectly formed potato rings 41 as shown in FIG. 3 and a plurality of potato tablets 42 as shown in FIG. 4. The rings and tablets of FIGS. 3 and 4 have the appearance illustrated only temporarily since the shrinkage and swellage while cooking will deform them until the tablets 42 assume a more or less spherical or ball-like shape and the rings assume a more or less doughnut shape.

Figure 5:
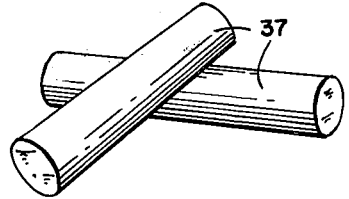
FIG. 5 is a similar perspective view illustrating a type of "potato stick" which could be formed in place of the potato balls in conjunction with the formation of the potato rings.

If the tablets or balls are not desired, the core rod 28 may be removed so that the core portions 37 of the potatoes will travel successively through the inner cutting tube and will be discharged therefrom as potato sticks equalling in length the lengths of the original potato as shown in FIG. 5.

While only two cutting tubes 21 and 22 have been illustrated it is of course to be understood that additional tubes could be added to produce an increased number of potato rings of thinner wall thickness.

Figure 6:
FIG. 6 is a side edge view of an alternate form of potato ring.
Figure 7:
FIG. 7 is a similar view of an alternate form of potato ball.

The knives in the knife frame have, for the purpose of illustration, been shown straight and parallel; they could have any desired configurations. For instance, conventional corrugated knives could be used. In which case, the potato rings would present a corrugated appearance as indicated in FIG. 6 and the tablets would produce a similar corrugated appearance as indicated in FIG. 7.

The cutting tubes 21 and 22 have been illustrated and described as cylindrical. They could have any desired cross sectional shape such as oval, square, or heart shapes if preferred.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. Means for forming a potato into rings comprising:
    (a) a cutting compartment having a rear wall and a front wall;
    (b) means for forcing a potato through the rear wall and into said compartment;
    (c) a plurality of concentric tubes of differing diameter extending through the front wall;
    (d) means forcing said tubes rearwardly through said potato as it enters through said rear wall;
    (e) means for withdrawing said tubes from said potato;
    (f) a plurality of parallel knives forming the bottom of said cutting compartment;
    (g) and a descending plunger positioned to descend onto said potato to force the latter through said bottom.

2. Means for forming a potato into rings comprising:
    (a) a potato slicing compartment having a rear wall and a front wall;
    (b) a plurality of spaced apart flexible diaphragms in the rear wall of said compartment, said diaphragms being provided with medially positioned, aligned, guide openings;
    (c) a potato receiving trough positioned rearwardly of said diaphragms;
    (d) a feed plunger mounted and longitudinally movable in said trough in axial alignment with said openings and adapted when moved forwardly to force a potato into the confines of said guide openings, the latter acting to support said potato in axial alignment with said plunger;
    (e) a plurality of reciprocal concentric cutting tubes extending through the forward wall of said slicing compartment in axial alignment with said plunger;
    (f) means for forcing said tubes against the potato while the latter is supported in said guide openings, after which said plunger forces said potato onto said cutting tubes;
    (g) a knife grill forming the floor in said cutting compartment and arranged to receive said potato after said cutting tubes are withdrawn therefrom;
    (h) and a vertically reciprocal plunger forming the top of said slicing compartment and arranged to descend upon and force said potato downwardly through said knife grill.

3. Means for forming a potato into rings as defined in claim 2; wherein the concentric cutting tubes (e) comprise an outer cutting tube and an inner cutting tube; and a stationary elongated tubular guide member in axial alignment with said feed plunger (d); said outer cutting tube being slidably mounted on the exterior of said guide member, and said inner cutting tube being slidably mounted within said guide member.

4. Means for forming a potato into rings as defined in claim 3; wherein the inner cutting tube extends slightly rearwardly of said outer cutting tube.

5. Means for forming a potato into rings as defined in claim 3; and further including a cross head member connected to the forward end of said outer cutting tube; radially extending arms adjacent the forward end of said inner cutting tube, and means connecting the radial arms to said cross head member so that the cutting tubes will move in unison.

References Cited in the file of this patent

UNITED STATES PATENTS

| 1,415,458 | Lewis | May 9, 1922 |
| 1,920,095 | McCall | July 25, 1933 |

FOREIGN PATENTS

| 764,717 | Great Britain | Jan. 2, 1957 |